United States Patent
Aloni-Lavi (10) Patent No.: US 12,469,491 B2
(45) Date of Patent: Nov. 11, 2025

(54) LANGUAGE MODEL CUSTOMIZATION TECHNIQUES AND APPLICATIONS THEREOF

(71) Applicant: GONG.io Ltd., Ramat Gan (IL)

(72) Inventor: Ruth Aloni-Lavi, Raanana (IL)

(73) Assignee: GONG.io Ltd., Ramat Gan (IL)

( * ) Notice: Subject to any disclaimer, the term of this patent is extended or adjusted under 35 U.S.C. 154(b) by 288 days.

(21) Appl. No.: 18/160,085

(22) Filed: Jan. 26, 2023

(65) Prior Publication Data
US 2024/0257804 A1  Aug. 1, 2024

(51) Int. Cl.
G10L 15/197  (2013.01)
G10L 15/065  (2013.01)
G10L 15/18   (2013.01)
G10L 15/22   (2006.01)

(52) U.S. Cl.
CPC .......... *G10L 15/197* (2013.01); *G10L 15/065* (2013.01); *G10L 15/1815* (2013.01); *G10L 15/22* (2013.01); *G10L 2015/228* (2013.01)

(58) Field of Classification Search
CPC . G10L 15/197; G10L 15/065; G10L 15/1815; G10L 15/22; G10L 2015/228; G10L 15/183
USPC ......................................................... 704/257
See application file for complete search history.

(56) References Cited

U.S. PATENT DOCUMENTS

| | | | |
|---|---|---|---|
| 6,173,266 B1 * | 1/2001 | Marx | H04M 3/527 704/E15.04 |
| 6,418,431 B1 * | 7/2002 | Mahajan | G10L 15/197 |
| 6,862,563 B1 * | 3/2005 | Hakewill | G06F 30/00 712/E9.05 |
| 8,352,246 B1 * | 1/2013 | Lloyd | G10L 25/12 704/9 |
| 8,996,372 B1 * | 3/2015 | Secker-Walker | G10L 15/34 704/231 |
| 9,047,868 B1 * | 6/2015 | O'Neill | G10L 15/197 |
| 9,153,231 B1 * | 10/2015 | Salvador | G10L 15/065 |
| 9,324,323 B1 * | 4/2016 | Bikel | G10L 15/197 |
| 9,460,713 B1 * | 10/2016 | Moreno Mengibar | G10L 15/07 |
| 10,152,973 B2 * | 12/2018 | Hoffmeister | G10L 15/22 |
| 10,379,808 B1 * | 8/2019 | Angel | G10L 15/22 |
| 10,388,272 B1 * | 8/2019 | Thomson | G10L 15/22 |
| 10,573,312 B1 * | 2/2020 | Thomson | G10L 15/22 |
| 10,943,583 B1 * | 3/2021 | Gandhe | G10L 15/183 |

(Continued)

*Primary Examiner* — Thuykhanh Le
(74) *Attorney, Agent, or Firm* — M&B IP Analysts, LLC (57) ABSTRACT

A system and method for automated speech recognition using customized language models. A method includes identifying a plurality of words among first content, wherein the first content corresponds to a use case; adjusting a language model based on the plurality of words in order to create a customized language model, wherein the customized language model is configured to output language predictions when applied to features extracted from audio content, wherein the language model is adjusted to increase a likelihood that the language model outputs the plurality of words as language predictions; applying the customized language model to second content in order to determine a plurality of outputs of the customized language model, wherein the second content is audio content corresponding to the use case; and determining speech recognition outputs based on the plurality of outputs of the customized language model.

15 Claims, 4 Drawing Sheets

(56) References Cited

U.S. PATENT DOCUMENTS

| | | | |
|---|---|---|---|
| 11,562,744 B1* | 1/2023 | Gao | G10L 13/033 |
| 2002/0087309 A1* | 7/2002 | Lee | G10L 15/1815 |
| | | | 704/E15.044 |
| 2002/0111806 A1* | 8/2002 | Franz | G10L 15/18 |
| | | | 704/255 |
| 2002/0188446 A1* | 12/2002 | Gao | G06F 40/216 |
| | | | 704/E15.009 |
| 2004/0158457 A1* | 8/2004 | Veprek | G10L 15/30 |
| | | | 704/E15.047 |
| 2005/0137868 A1* | 6/2005 | Epstein | G10L 15/183 |
| | | | 704/252 |
| 2007/0106509 A1* | 5/2007 | Acero | G06F 16/61 |
| | | | 707/E17.101 |
| 2007/0106512 A1* | 5/2007 | Acero | G10L 15/197 |
| | | | 704/260 |
| 2007/0219779 A1* | 9/2007 | Kojima | G06F 40/30 |
| | | | 704/9 |
| 2008/0046244 A1* | 2/2008 | Ohno | G10L 15/30 |
| | | | 704/E15.047 |
| 2008/0177545 A1* | 7/2008 | Li | G06F 40/211 |
| | | | 704/E15.04 |
| 2008/0215311 A1* | 9/2008 | Chelba | G06F 40/44 |
| | | | 704/9 |
| 2009/0313017 A1* | 12/2009 | Nakazawa | G10L 15/065 |
| | | | 704/E15.001 |
| 2011/0313767 A1* | 12/2011 | Duffield | G10L 15/22 |
| | | | 704/E15.001 |
| 2012/0041764 A1* | 2/2012 | Xu | G10L 15/065 |
| | | | 704/256.1 |
| 2012/0191449 A1* | 7/2012 | Lloyd | H04M 1/6075 |
| | | | 704/E15.001 |
| 2012/0290292 A1* | 11/2012 | Liu | G06F 40/279 |
| | | | 704/E11.001 |
| 2014/0025380 A1* | 1/2014 | Koch | G10L 15/30 |
| | | | 704/E15.005 |
| 2014/0365218 A1* | 12/2014 | Chang | G10L 15/19 |
| | | | 704/244 |
| 2014/0379346 A1* | 12/2014 | Aleksic | G06V 30/274 |
| | | | 704/251 |
| 2015/0269938 A1* | 9/2015 | Lloyd | G10L 15/183 |
| | | | 704/235 |
| 2015/0370787 A1* | 12/2015 | Akbacak | G06F 40/47 |
| | | | 704/2 |
| 2016/0071519 A1* | 3/2016 | Hoffmeister | G10L 15/30 |
| | | | 704/232 |
| 2016/0117686 A1* | 4/2016 | Srivatchan | G06Q 30/0185 |
| | | | 705/318 |
| 2016/0253989 A1* | 9/2016 | Kuo | G10L 15/183 |
| | | | 704/257 |
| 2016/0275946 A1* | 9/2016 | Caseiro | G06F 40/216 |
| 2016/0292797 A1* | 10/2016 | Tucker | G06Q 30/0635 |
| 2016/0293163 A1* | 10/2016 | Moreno Mengibar | G06F 3/167 |
| 2016/0316059 A1* | 10/2016 | Nuta | G06N 7/01 |
| 2017/0125013 A1* | 5/2017 | Yan | G10L 15/197 |
| 2017/0154033 A1* | 6/2017 | Lee | G10L 15/16 |
| 2017/0278150 A1* | 9/2017 | Tucker | H04W 4/029 |
| 2018/0068652 A1* | 3/2018 | Yong | G10L 15/063 |
| 2018/0173690 A1* | 6/2018 | Smith | G06F 3/023 |
| 2018/0211652 A1* | 7/2018 | Mun | G10L 15/187 |
| 2018/0233131 A1* | 8/2018 | Aleksic | G10L 15/187 |
| 2018/0233150 A1* | 8/2018 | Gruenstein | G10L 15/30 |
| 2018/0336900 A1* | 11/2018 | Zou | G06F 40/51 |
| 2019/0027133 A1* | 1/2019 | Georges | G10L 15/193 |
| 2019/0122657 A1* | 4/2019 | James | G10L 15/1815 |
| 2019/0206389 A1* | 7/2019 | Kwon | G10L 15/063 |
| 2019/0279618 A1* | 9/2019 | Yadav | G06F 40/30 |
| 2019/0279747 A1* | 9/2019 | Friedland | G16H 15/00 |
| 2019/0287415 A1* | 9/2019 | Zavesky | G09B 7/00 |
| 2019/0318731 A1* | 10/2019 | Jost | G10L 15/05 |
| 2019/0371297 A1* | 12/2019 | Kim | G06F 17/16 |
| 2019/0378495 A1* | 12/2019 | Kim | G10L 15/063 |
| 2020/0066281 A1* | 2/2020 | Grancharov | G10L 17/06 |
| 2020/0160838 A1* | 5/2020 | Lee | G10L 15/183 |
| 2020/0175961 A1* | 6/2020 | Thomson | G10L 15/28 |
| 2020/0175963 A1* | 6/2020 | Aleksic | G10L 15/197 |
| 2020/0243094 A1* | 7/2020 | Thomson | G10L 15/28 |
| 2020/0258504 A1* | 8/2020 | Lee | G10L 15/063 |
| 2020/0327884 A1* | 10/2020 | Bui | G06N 3/08 |
| 2021/0004542 A1* | 1/2021 | Yun | G06F 40/47 |
| 2021/0120206 A1* | 4/2021 | Liu | G06F 9/54 |
| 2021/0304769 A1* | 9/2021 | Ye | G10L 15/26 |
| 2022/0164378 A1* | 5/2022 | Daley | G06F 16/532 |
| 2022/0319497 A1* | 10/2022 | Hong | G10L 15/063 |
| 2022/0358908 A1* | 11/2022 | Gandhe | G10L 15/065 |
| 2022/0366904 A1* | 11/2022 | Martinson | G10L 15/08 |
| 2022/0374605 A1* | 11/2022 | Sethi | G06T 19/006 |
| 2022/0383859 A1* | 12/2022 | Mimassi | G10L 15/16 |
| 2022/0383877 A1* | 12/2022 | Nam | G10L 15/26 |
| 2022/0415320 A1* | 12/2022 | Zheng | G06F 40/237 |
| 2023/0098783 A1* | 3/2023 | Zaremoodi | G06N 3/044 |
| | | | 704/243 |
| 2023/0122941 A1* | 4/2023 | Biadsy | G10L 15/32 |
| | | | 704/257 |
| 2023/0141398 A1* | 5/2023 | Bahdanau | G06F 40/30 |
| | | | 704/9 |
| 2023/0145324 A1* | 5/2023 | Sharifi | G10L 17/22 |
| | | | 704/248 |
| 2023/0215419 A1* | 7/2023 | Yun | G10L 13/04 |
| | | | 704/258 |
| 2023/0245654 A1* | 8/2023 | Shrivastava | G10L 15/1822 |
| | | | 704/243 |
| 2023/0419952 A1* | 12/2023 | Desai | G06F 40/35 |
| 2024/0037316 A1* | 2/2024 | Mohanty | G10L 13/00 |
| 2024/0037941 A1* | 2/2024 | Miller-Smith | G06V 10/762 |
| 2024/0054991 A1* | 2/2024 | Jain | G06V 10/7747 |
| 2024/0111792 A1* | 4/2024 | Yazdanpanah | G06V 30/14 |
| 2025/0140249 A1* | 5/2025 | Sharifi | G10L 15/183 |

* cited by examiner

LANGUAGE MODEL CUSTOMIZATION TECHNIQUES AND APPLICATIONS THEREOF

TECHNICAL FIELD

The present disclosure relates generally to automated speech recognition, and more specifically to language identification models.

BACKGROUND

Audio processing, and particularly processing of audio content including speech, is a critical component to any computer-implemented speech recognition program used for understanding and acting upon words said during conversations. Various solutions for processing speech content exist. In particular, several solutions utilize one or more models for purposes such as recognizing the language being spoken during a conversation, the sounds being made, and more. To this end, automated speech recognition systems often include components such as an acoustic model and a language model (also referred to as a language identification model).

An acoustic model typically handles analysis of raw audio waveforms of human speech by generating predictions for the phoneme (unit of sounds) each waveform corresponds to. The waveforms analyzed by the acoustic model are extremely nuanced. Not only can they be based on actual sounds produced by a given speaker, but they can also be influenced by background noise from the environment in which the sounds are captured. The language model makes predictions related to the structure of language such as, for example, probabilities for certain sequences of words. In particular, a language identification model may be used to predict the language being spoken based on the structure of the grammar within the analyzed speech content.

Techniques for improving accuracy of automated speech recognition are highly desirable in order to provide accurate transcripts or other uses of detected speech. Also, techniques which facilitate real-time improvements to language models would be desirable in order to improve results when a large amount of time and training data are not available for a particular speaker or subject.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for automated speech recognition using customized language models. The method comprises: identifying a plurality of words among first content, wherein the first content corresponds to a use case; adjusting a language model based on the plurality of words in order to create a customized language model, wherein the customized language model is configured to output language predictions when applied to features extracted from audio content, wherein the language model is adjusted to increase a likelihood that the language model outputs the plurality of words as language predictions; applying the customized language model to second content in order to determine a plurality of outputs of the customized language model, wherein the second content is audio content corresponding to the use case; and determining speech recognition outputs based on the plurality of outputs of the customized language model.

Certain embodiments disclosed herein also include a non-transitory computer readable medium having stored thereon causing a processing circuitry to execute a process, the process comprising: identifying a plurality of words among first content, wherein the first content corresponds to a use case; adjusting a language model based on the plurality of words in order to create a customized language model, wherein the customized language model is configured to output language predictions when applied to features extracted from audio content, wherein the language model is adjusted to increase a likelihood that the language model outputs the plurality of words as language predictions; applying the customized language model to second content in order to determine a plurality of outputs of the customized language model, wherein the second content is audio content corresponding to the use case; and determining speech recognition outputs based on the plurality of outputs of the customized language model.

Certain embodiments disclosed herein also include a system for automated speech recognition using customized language models. The system comprises: a processing circuitry; and a memory, the memory containing instructions that, when executed by the processing circuitry, configure the system to: identify a plurality of words among first content, wherein the first content corresponds to a use case; adjust a language model based on the plurality of words in order to create a customized language model, wherein the customized language model is configured to output language predictions when applied to features extracted from audio content, wherein the language model is adjusted to increase a likelihood that the language model outputs the plurality of words as language predictions; apply the customized language model to second content in order to determine a plurality of outputs of the customized language model, wherein the second content is audio content corresponding to the use case; and determine speech recognition outputs based on the plurality of outputs of the customized language model.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

The various disclosed embodiments include a method and system for customizing language models and for improving automated speech recognition via use of customized language models. More specifically, the disclosed embodiments allow for using text-based content serving as examples of a particular use case in order to tune a language model to the use case, thereby configuring the language model to make more accurate predictions when applied to audio content related to the use case. The disclosed embodiments therefore provide language models which are customized to a particular entity, subject, topic, or the like, and which can be utilized to improve automated speech recognition. Moreover, allowing for customizing language models using text-based content reduces the amount of audio data required to configure the language models to make accurate predictions, thereby improving efficiency of training and configuration of the language models.

Additionally, the disclosed embodiments may be utilized in order to update a language model in real-time while custom content is being presented in order to improve accuracy of real-time automated speech recognition. That is, custom content may be analyzed and utilized to adjust weights of the language model while the custom content is being presented or otherwise while audio accompanies the custom content. As a non-limiting example, when the custom content is content for a presentation about a particular topic, the presentation file may be analyzed and utilized to customize the language model in real-time in order to provide more accurate speech recognition for a speaker who is speaking in coordination with the presentation slides. As a further example, the customized language model may be utilized to improve automated speech recognition for purposes such as providing closed captioning or a transcript of the speech, since the audio content of the speaker will likely utilize similar terminology to that of the presentation.

Figure 1:
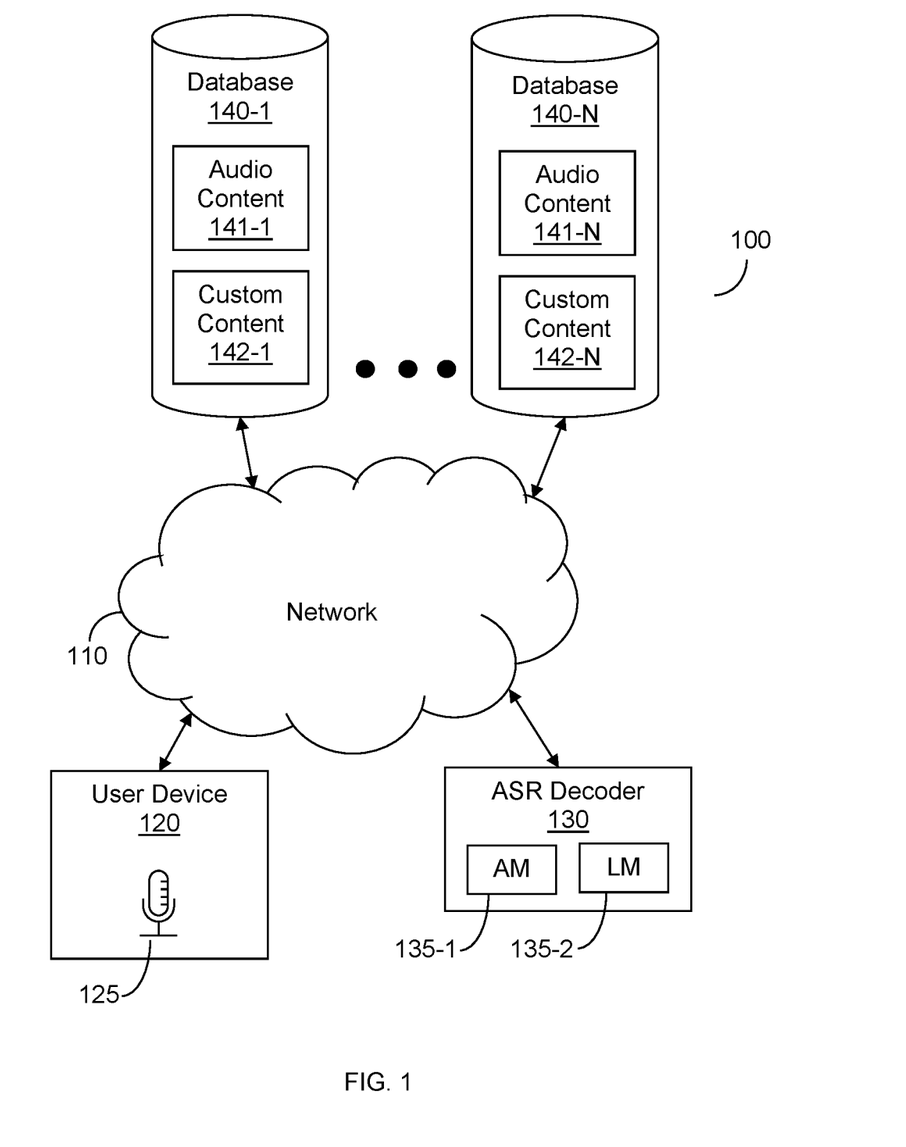
FIG. 1 is a network diagram utilized to describe various disclosed embodiments.

FIG. 1 shows an example network diagram 100 utilized to describe the various disclosed embodiments. In the example network diagram 100, a user device 120, an automated speech recognition (ASR) decoder 130, and a plurality of databases 140-1 through 140-N (hereinafter referred to individually as a database 140 and collectively as databases 140, merely for simplicity purposes) communicate via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The user device (UD) 120 may be, but is not limited to, a personal computer, a laptop, a tablet computer, a smartphone, a wearable computing device, or any other device capable of receiving speech recognition outputs and utilizing those outputs for one or more user-facing functions. As non-limiting examples, the user device 120 may be configured to use speech recognition outputs for speech-to-text functions (e.g., for closed captioning or speech-to-text logging), for voice-activated commands (e.g., commands to a virtual agent or a self-driving vehicle), for voice-based authentication, combinations thereof, and the like.

The user device 120 may be further equipped with one or more input/output (I/O) devices and, in particular, audio-based I/O devices such as one or more microphones 125. The microphones 125 may be used to capture audio content containing speech (i.e., speech spoken by a user of the user device 120 or by others within capturing range of the microphones) in order to provide the ASR decoder 130 with audio content to be processed in accordance with the disclosed embodiments.

In an embodiment, the ASR decoder 130 is configured to process audio content (for example, audio content captured by the microphone 125 of the user device 120) in accordance with one or more of the disclosed techniques. To this end, the ASR decoder 130 may store components of a speech recognition model (not depicted separately) including, but not limited to, an acoustic model (AM) 135-1 and a language model (LM) 135-2. In some embodiments, the ASR decoder 130 is configured to train at least the acoustic model 135-1, the language model 135-2, or both. In accordance with various disclosed embodiments, the ASR decoder 130 is configured to customize the language model 135-2 for a particular subject, entity, topic, or other use case in order to provide more accurate automated speech recognition when processing audio data for that use case. As a non-limiting example, the language model 135-2 may be customized with respect to words and phrases commonly used in a call center in order to improve automated speech recognition of calls between customer service representatives with customers or potential customers.

The training of either or both of the models 135-1 and 135-2 may be performed using training audio content such as, but not limited to, audio content 141-1 through 141-N stored in respective databases 140-1 through 140-N. Such audio content 141 stored in the databases 140 includes audio content containing speech.

Further, the language model 135-2 may be customized using custom content 142-1 through 142-N which may be stored in any of the databases 140. The custom content 142 provides examples demonstrating use of particular key terms related to particular use cases and includes, but is not limited to, content containing text, audio or visual content from which text can be derived, combinations thereof, and the like. As a non-limiting example, the custom content 142 may include presentation files containing images and text, where the text demonstrates use of certain key terms related to football.

It should be noted that the user device 120 and the ASR decoder 130 are depicted as separate entities for the sake of discussion, but that at least a portion of the functions performed by the ASR decoder 130 may be performed by the user device 120 and vice versa without departing from the scope of the disclosure.

For example, the user device may be configured to apply the acoustic model 135-1, the language model 135-2, or both, in order to process the speech captured via the I/O devices 125 rather than sending such audio content for processing from the user device 120 to the ASR decoder 130. Likewise, the user device 120 may be configured to capture and send audio content to the ASR decoder 130, the ASR decoder 130 may be further configured to perform one or more of the functions that utilize the outputs of the speech acoustic and language models 135-1 and 135-2, and the results of such functions may be sent to the user device 120 for subsequent processing.

It should also be noted that a single language model 135-2 is depicted in FIG. 1 merely for simplicity, but that multiple language models may be utilized without departing from the scope of the disclosure. Each language model may be customized as described herein for a different use. As a non-limiting example, different language models may be customized for different organizations, and the language model customized for each organization is used to process audio from that organization.

Figure 2:
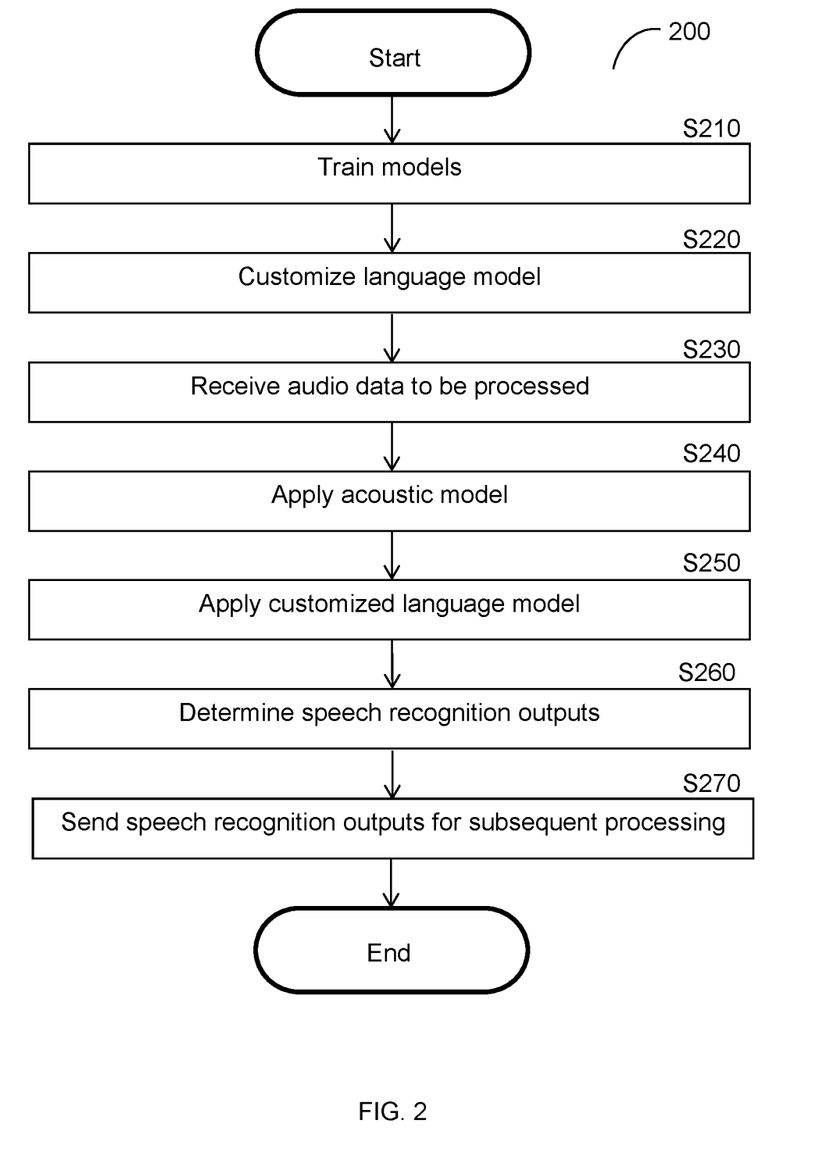
FIG. 2 is a flowchart illustrating a method for utilizing customized models for automated speech recognition according to an embodiment.

FIG. 2 is a flowchart 200 illustrating a method for utilizing customized models for automated speech recognition according to an embodiment.

At S210, models to be used for speech recognition are configured. In an embodiment, the models include models utilized for speech recognition such as, but not limited to, an acoustic model, one or more language models, and the like. Configuring the models may include, but is not limited to, training the models using machine learning based on training audio content. It is noted that the training of the models is not limited to a specific order, does not need to be performed sequentially, is not otherwise limited to a particular timing or need to be part of a particular process without departing from at least some of the various disclosed embodiments.

At S220, one or more of the language models are customized. Specifically, the language models are customized for a particular use case using custom content demonstrating examples of use of terms for the given use case. The resulting language models are customized so as to produce more accurate language identification results when applied to audio content related to their respective use cases. To this end, each language model is customized using a respective set of custom content for its intended use case.

Figure 3:
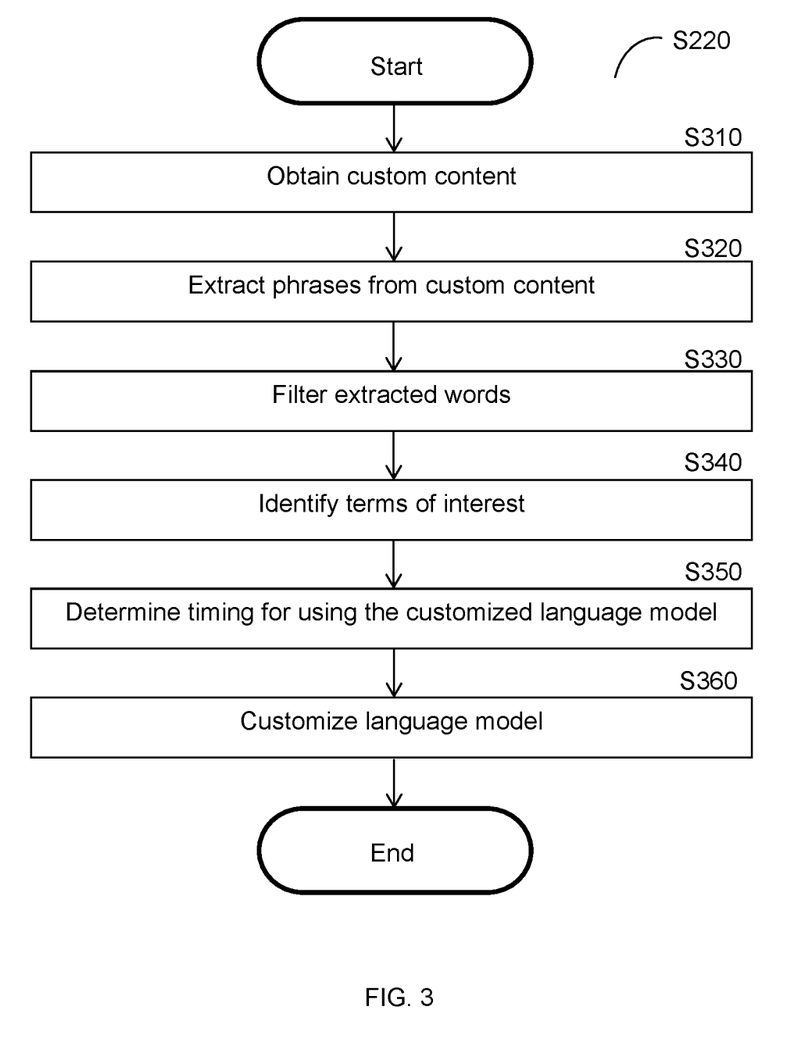
FIG. 3 is a flowchart illustrating a method for customizing a language model according to an embodiment.

In an embodiment, each language model may be customized as now described with respect to FIG. 3. FIG. 3 is a flowchart S220 illustrating a method for customizing a language model according to an embodiment.

At S310, custom content to be used for customizing a language model is obtained. The custom content serves as examples of the kind of content which should be processed using the customized language model and, specifically, demonstrates use of words to be utilized for customizing the language model. The custom content may include text content or other content from which text can be derived (e.g., audio or images in which words can be identified and textual representations of those words can be determined). The custom content may be related to a particular topic or entity such that the language model customized based on the custom content can be utilized to make accurate predictions for other content related to the same topic or entity.

In some embodiments, the custom content to be used for customizing the language model may be a portion of a broader set of content. As a non-limiting example, when content of a presentation includes various slides with different words and/or images on them, the custom content to be used for any given customization of the language model may be a particular slide, set of slides, slides associated with a given speaker (e.g., as indicated by metadata of the slides), combinations thereof, and the like. Thus, in such embodiments, S310 may further include identifying the portion of content to be used as the custom content for a given customization of a language model.

At S320, phrases are extracted from the custom content. The extracted phrases demonstrate terms which are more likely to appear within the custom content such that the language model can be adjusted to increase the probabilities for identifying the extracted phrases, thereby improving the accuracy of language model predictions when the customized language model is applied to similar or related content (e.g., audio content for a speaker giving a presentation when the custom content includes one or more slides including text of the presentation). The result of S320 is a list of extracted phrases identified within the custom content. The extracted phrases may be, but are not limited to, combinations of words.

In an embodiment, extracting the phrases may include identifying words within text of the custom content. Alternatively or in combination, when the custom content includes visual content such as images or video, extracting the words from the custom content may further include processing the custom content using optical character recognition (OCR) or other techniques for identifying words within such visual content. As a non-limiting example, when the custom content includes a presentation which is only shown in video content, extracting the phrases may include performing OCR on portions of the video content showing slides of the presentation in order to identify combinations of words shown among the presentation.

At S330, words are filtered from among the extracted words. In an embodiment, S330 includes applying filtering rules defining at least a predetermined list of words to be filtered. The predetermined list of words to be filtered may include, but is not limited to, frequently occurring words (e.g., "a", "the", etc.), unreasonable or otherwise uncommon words (e.g., slang or curse words which are unlikely to be used in a given context), or otherwise unwanted words.

At S340, terms of interest are identified among the extracted words. Each term of interest may be, but is not limited to, a word or combinations of words.

In an embodiment, S340 may include identifying words which are related to a predetermined topic or entity of interest and extracting those words. To this end, S340 may include analyzing the extracted words with respect to one or more lists of predetermined words that were previously observed with respect to the topic or entity of interest. This allows for reducing the potential words to be used for customizing the language model while allowing the language model to be further customized to specific content related to the topic or entity of interest (e.g., content related to a topic of interest by a particular speaker who may have their own vocabulary and/or may demonstrate other tendencies with respect to word choice).

At optional S350, a timing for using the language model is determined. The timing for using the language model may be, but is not limited to, a time at which audio content related to the custom content is to be projected or otherwise when such audio content will need to be processed using the customized language model.

As a non-limiting example, when the custom content used to customize the language model is one or more presentation slides for a presentation where a speaker will talk about the presentation slides, the timing for using the language model customized to that custom content may be a time period during which the speaker is scheduled to be talking. In this regard, the application of the customized language model may be timed so as to maximize accuracy of predictions made using the language model by using the customized language model during times when related audio content (i.e., audio content which corresponds to the custom content, or audio content related to the same topic or entity as the custom content) will be processed using a language model.

Moreover, when the custom content is part of a broader set of content which may be related to multiple topics and/or entities, different language models may be applied when audio content related to respective topics and/or entities needs to be processed. As a non-limiting example, when multiple language models are customized based on respective sets of custom content each containing one or more slides to be presented by a speaker of a different company, each language model will effectively be customized to that company and may be utilized for audio processing to provide closed captioning for the presentation when the speaker from the respective company is presenting. This allows for making more accurate language model predictions without requiring as much training data or otherwise while reducing the amount of computing resources needed for achieving accurate results using language models.

At S360, the language model is customized based on the terms of interest identified among the extracted words. The manner in which the language model is customized may depend on a type of language model, the way in which the language model is configured, and the like. To this end, in some embodiments, customizing the language model may include adjusting one or more weights of the language model used for making predictions.

More specifically, weights corresponding to specific words (e.g., words which are included in the identified terms of interest or otherwise words identified within the extracted words) may be adjusted. As a non-limiting example, for a language model realized as an N-gram model, a weight for each word identified as part of a term of interest is identified within the N-gram model, and the weight for each identified word is increased in various portions of the N-gram model in order to increase the probability that its respective word will be predicted when the language model is applied to features extracted from audio content.

In this regard, the custom content effectively serves as an example of words which are more likely to appear in related content (e.g., audio content including speaking about the custom content such as audio of a speaker giving a presentation about custom content in the form of presentation slides with text and/or images). By identifying words within the custom content, a language model can therefore be customized to the custom content by adjusting the probabilities for the language model in order to make certain words either more or less likely to be predicted via outputs of the language model. This, in turn, allows the language model to produce more accurate results when analyzing audio content that is related to the custom content (e.g., corresponding audio content for the custom content). Additionally, language models may be customized for different purposes using a smaller set of custom content than would be required to train the language model to produce accurate results for various different topics or conversations. This, in turn, allows for reducing the amount of training data needed as well as the amount of time and processing power needed to train the model as compared to training a general model which achieves comparable accuracy when applied to disparate portions of audio content.

It should be noted that a single iteration of customizing the language model is shown and described with respect to FIG. 3 merely for simplicity purposes but that a single language model may be customized in order to create multiple custom language models without departing from the scope of the disclosure. Moreover, creation of such custom language models may be performed in series or in parallel in accordance with various disclosed embodiments.

Returning to FIG. 2, at S230, audio content to be processed using the customized language model is received. The received audio content at least includes speech content and, in particular, speech content which might be related to use cases such as subjects, topics, entities, speakers, and the like, for which one or more language models were customized.

At S240, the trained acoustic model is applied to features extracted from the audio content. The acoustic model outputs a set of predictions for potential acoustics in the audio content. In an embodiment, S240 may further include applying one or more other models used for audio processing such as, but not limited to, a decoder. The decoder may be applied to inputs including or otherwise determined based on the predictions output by the acoustic model.

At S250, a customized language model is applied to features extracted from the audio content. The language model is customized as described above with respect to FIG. 3. In particular, the weights of the language model are adjusted by example custom content demonstrating use of certain words as part of key terms in a given use case, or the language model is otherwise adjusted so as to increase a likelihood that the language model outputs words identified among custom content as language predictions.

In some embodiments, S250 further includes selecting the customized language model to be applied. To this end, S250 may include, but is not limited to, performing an initial analysis of the audio content with respect to potential use cases for which language models were previously customized. The use case may be, but is not limited to, a topic or entity corresponding to the custom content used to customize each customized language model. In a further embodiment, S250 includes applying use case identification rules in order to determine the use case for the audio content based on, for example, metadata of the audio content, initial analysis of the audio content using automated speech recognition with a general (non-customized) language model, both, and the like. The initial analysis may be utilized to identify certain predetermined key terms which are known to be associated with a particular topic or entity and can therefore be utilized to identify that the use case for the audio content relates to that topic or entity.

The initial analysis of the audio content may include, but is not limited to, performing automated speech recognition on at least a portion of the audio content using a general or otherwise non-customized language model in order to identify potential key terms (e.g., key terms among a predetermined list of known key terms corresponding to respective use cases) and determining the use case, then selecting the language model to be used based on the determined use case. Alternatively, the use case may be known and the language model is selected based on the known use case. As a non-limiting example, metadata for the audio content may indicate that the audio content was captured from employees of "ABC Company", and a language model customized for ABC Company is selected for use.

In a further embodiment, different language models may be selected and utilized at different times. In particular, when a language model is customized into multiple custom language models for multiple portions of custom content (as a non-limiting example, multiple slides in a single presentation), the timing for using each customized language model may be determined based on respective times associated with each portion of custom content (e.g., known time periods during which each slide is to be presented), and the customized language model to be used at any given time may be selected based on the current time. For example, when timings for adjustment are determined as discussed above with respect to S350, the determined timings for adjustment may be utilized to select the customized language models at applicable times, i.e., by selecting a language model to be used such that each customized language model may be selected when its respective timing for adjustment occurs.

At S260, speech recognition outputs are determined based on the outputs of the acoustic and language model models.

The speech recognition results in identification of spoken words in multiple languages based on acoustics identified within the audio content. In an embodiment, S260 may include applying one or more automated speech recognition (ASR) techniques such as, but not limited to, deep neural networks (DNNs), Hidden Markov models (HMMs), dynamic time warping (DTW), deep learning ASR algorithms, combinations thereof, and the like.

It should be noted that steps S240 through S260 are illustrated as separate steps in a particular sequence merely for purposes of discussing various different aspects of the speech recognition process, but that the disclosed embodiments are not limited to the particular sequence depicted in FIG. 2. The acoustic and language models may be applied in a different order or in parallel, and may be performed as part of a broader speech recognition process yielding speech recognition outputs.

At S270, the results of the speech recognition are output as recognized speech and sent for subsequent processing. The subsequent processing may include, but is not limited to, modifying the speech recognition outputs (e.g., reformatting, cleaning, or otherwise adjusting the outputs for later use), providing the speech recognition outputs to a model or program which utilizes speech outputs (e.g., for speech-to-text processing or other uses), both, and the like. To this end, the outputs of the speech recognition process are provided as inputs to one or more processes for subsequent processing. In some implementations, the outputs of the speech recognition may be sent to one or more systems (e.g., the user device 120, FIG. 1) configured for such subsequent processing.

In some embodiments, S270 further includes utilizing the outputs for one or more subsequent processing steps such as, but not limited to, creating text (e.g., for a speech-to-text program), providing words identified among the recognized speech as inputs to a decision model (e.g., a model for determining which actions to take based on user inputs in the form of spoken words), and the like. To this end, in such embodiments, S270 may include applying models or programs configured to perform such subsequent processing to the outputs of the speech recognition or to features extracted from those outputs in order to perform the subsequent processing.

Figure 4:
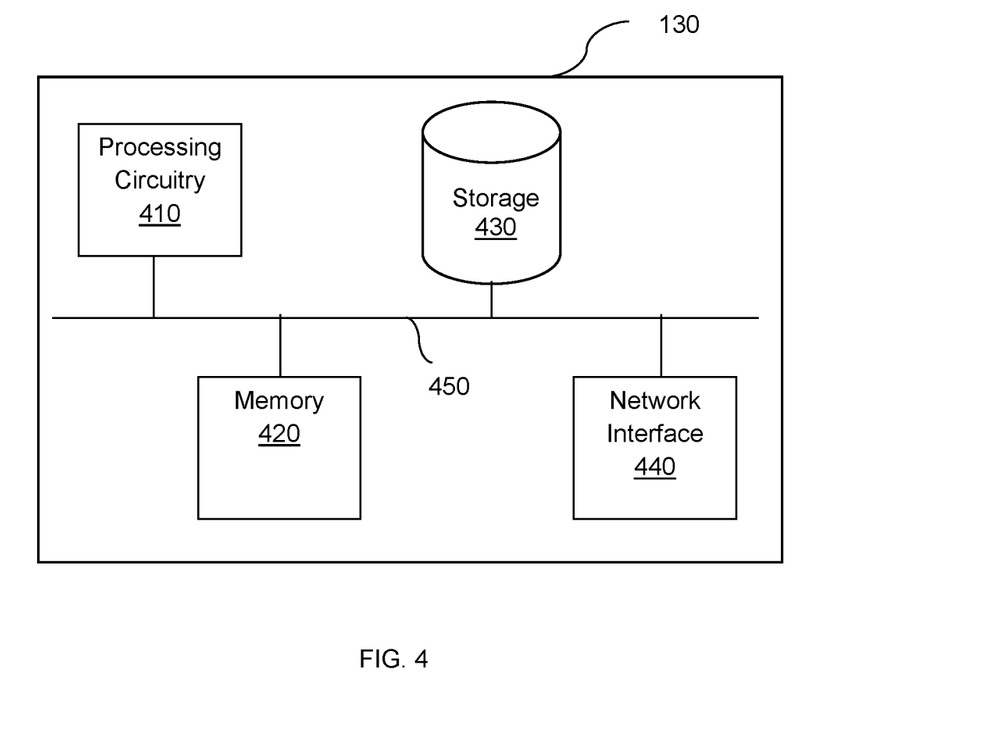
FIG. 4 is a schematic diagram of a customizer according to an embodiment.

FIG. 4 is an example schematic diagram of an automated speech recognition (ASR) decoder 130 according to an embodiment. The ASR decoder 130 includes a processing circuitry 410 coupled to a memory 420, a storage 430, and a network interface 440. In an embodiment, the components of the ASR decoder 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the ASR decoder 130 to communicate with, for example, the user device 120, the databases 140, and the like.

It should be understood that the embodiments described herein are not limited to the specific architecture illustrated in FIG. 4, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for automated speech recognition using customized language models, comprising:
    identifying a plurality of words among first content, wherein the first content corresponds to a use case, wherein the first content demonstrates use of the plurality of words in the corresponding use case, wherein the plurality of words is a second plurality of words, further comprising:
        extracting a first plurality of words from the first content;
        identifying a plurality of predefined terms among the first plurality of words, wherein the second plurality of words includes words among the identified plurality of predefined terms; and
        filtering a portion of the first plurality of words based on a predetermined list of words to be filtered, wherein the plurality of predefined terms is identified among the first plurality of words that are not the filtered portion of the first plurality of words;
    adjusting a language model based on the second plurality of words in order to create a customized language model, wherein the customized language model is configured to output language predictions when applied to features extracted from audio content, wherein the language model is adjusted to increase a likelihood that the language model outputs the second plurality of words as language predictions, wherein adjusting the language model includes adjusting weights corresponding to the identified second plurality of words;
    applying a trained acoustic model to second content in order to output a set of potential acoustics in the second content;
    applying the customized language model to the second content in order to determine a plurality of outputs of the customized language model, wherein the second content is audio content corresponding to the use case; and
    determining speech recognition outputs based on the plurality of outputs of the customized language model and the set of potential acoustics of the trained acoustic model.

2. The method of claim 1, wherein the plurality of predefined terms corresponds to the use case.

3. The method of claim 1, wherein the first content includes visual content of a presentation, wherein the second content is audio content of a speaker presenting at least a portion of the presentation.

4. The method of claim 3, wherein the first content is a plurality of slides of the presentation, wherein the at least the portion of the presentation corresponds to at least one slide of the plurality of slides.

5. The method of claim 1, wherein the use case is a first use case of a plurality of use cases, wherein the customized language model is a first customized language model of a plurality of customized language models, each of the plurality of customized language models corresponding to a respective use case of the plurality of use cases, further comprising:
    determining that the second content corresponds to the first use case by analyzing at least one of the second content, and metadata of the second content; and
    selecting the first customized language model for application based on the second content.

6. The method of claim 1, further comprising:
    determining a timing for applying the customized language model based on a time period during which the second content will be presented, wherein the customized language model is applied at the determined timing.

7. The method of claim 1, wherein the use case is any of: a topic, and an entity.

8. A non-transitory computer-readable medium having stored thereon instructions for causing a processing circuitry to execute a process, the process comprising:
    identifying a plurality of words among first content, wherein the first content corresponds to a use case, wherein the first content demonstrates use of the plurality of words in the corresponding use case, wherein the plurality of words is a second plurality of words, wherein the system is further configured to:
        extract a first plurality of words from the first content;
        identify a plurality of predefined terms among the first plurality of words, wherein the second plurality of words includes words among the identified plurality of predefined terms; and
        filter a portion of the first plurality of words based on a predetermined list of words to be filtered, wherein the plurality of predefined terms is identified among the first plurality of words that are not the filtered portion of the first plurality of words;
    adjusting a language model based on the second plurality of words in order to create a customized language model, wherein the customized language model is configured to output language predictions when applied to features extracted from audio content, wherein the language model is adjusted to increase a likelihood that the language model outputs the second plurality of words as language predictions, wherein adjusting the language model includes adjusting weights corresponding to the identified second plurality of words;
    applying a trained acoustic model to second content in order to output a set of potential acoustics in the second content;
    applying the customized language model to the second content in order to determine a plurality of outputs of the customized language model, wherein the second content is audio content corresponding to the use case; and determining speech recognition outputs based on the plurality of outputs of the customized language model and the set of potential acoustics of the trained acoustic model.

9. A system for automated speech recognition using customized language models, comprising:
a processing circuitry; and
a memory, the memory containing instructions that, when executed by the processing circuitry, configure the system to:
identify a plurality of words among first content, wherein the first content corresponds to a use case, wherein the first content demonstrates use of the plurality of words in the corresponding use case, wherein the plurality of words is a second plurality of words, wherein the system is further configured to:
extract a first plurality of words from the first content;
identify a plurality of predefined terms among the first plurality of words, wherein the second plurality of words includes words among the identified plurality of predefined terms; and
filter a portion of the first plurality of words based on a predetermined list of words to be filtered, wherein the plurality of predefined terms is identified among the first plurality of words that are not the filtered portion of the first plurality of words;
adjust a language model based on the second plurality of words in order to create a customized language model, wherein the customized language model is configured to output language predictions when applied to features extracted from audio content, wherein the language model is adjusted to increase a likelihood that the language model outputs the second plurality of words as language predictions, wherein adjusting the language model includes adjusting weights corresponding to the identified second plurality of words;
apply a trained acoustic model to second content in order to output a set of potential acoustics in the second content;
apply the customized language model to the second content in order to determine a plurality of outputs of the customized language model, wherein the second content is audio content corresponding to the use case; and
determine speech recognition outputs based on the plurality of outputs of the customized language model and the set of potential acoustics of the trained acoustic model.

10. The system of claim 9, wherein the plurality of predefined terms corresponds to the use case.

11. The system of claim 9, wherein the first content includes visual content of a presentation, wherein the second content is audio content of a speaker presenting at least a portion of the presentation.

12. The system of claim 11, wherein the first content is a plurality of slides of the presentation, wherein the at least the portion of the presentation corresponds to at least one slide of the plurality of slides.

13. The system of claim 9, wherein the use case is a first use case of a plurality of use cases, wherein the customized language model is a first customized language model of a plurality of customized language models, each of the plurality of customized language models corresponding to a respective use case of the plurality of use cases, wherein the system is further configured to:
determine that the second content corresponds to the first use case by analyzing at least one of the second content, and metadata of the second content; and
select the first customized language model for application based on the second content.

14. The system of claim 9, wherein the system is further configured to:
determine a timing for applying the customized language model based on a time period during which the second content will be presented, wherein the customized language model is applied at the determined timing.

15. The system of claim 9, wherein the use case is any of: a topic, and an entity.

* * * * *